(12) United States Patent
Duan et al.

(10) Patent No.: US 10,734,712 B2
(45) Date of Patent: Aug. 4, 2020

(54) ANTENNA DOWNTILT ADJUSTMENT APPARATUS AND COMMUNICATIONS DEVICE

(71) Applicant: HUAWEI TECHNOLOGIES CO., LTD., Shenzhen (CN)

(72) Inventors: Fangqing Duan, Dongguan (CN); Jianping Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/584,951

(22) Filed: Sep. 27, 2019

(65) Prior Publication Data
US 2020/0028245 A1     Jan. 23, 2020

Related U.S. Application Data

(63) Continuation of application No. PCT/CN2017/078945, filed on Mar. 31, 2017.

(51) Int. Cl.
| | |
|---|---|
| *H04M 1/00* | (2006.01) |
| *H01Q 1/24* | (2006.01) |
| *H01Q 5/30* | (2015.01) |
| *H01Q 1/12* | (2006.01) |
| *H01Q 3/32* | (2006.01) |
| *H01Q 19/10* | (2006.01) |
| *H04W 16/28* | (2009.01) |

(52) U.S. Cl.
CPC ............. *H01Q 1/246* (2013.01); *H01Q 1/125* (2013.01); *H01Q 3/32* (2013.01); *H01Q 5/30* (2015.01); *H01Q 19/10* (2013.01); *H04W 16/28* (2013.01)

(58) Field of Classification Search
CPC .......... H01Q 1/246; H01Q 5/30; H01Q 1/125; H01Q 3/32; H01Q 19/10; H04W 16/28
USPC ...................................................... 455/562.1
See application file for complete search history.

(56) References Cited

U.S. PATENT DOCUMENTS

| | | | | |
|---|---|---|---|---|
| 6,310,585 B1 * | 10/2001 | Marino | ..................... | H01P 1/18 343/817 |
| 10,270,159 B1 * | 4/2019 | Bryce | ..................... | H01Q 1/42 |

(Continued)

*Primary Examiner* — Edward F Urban
*Assistant Examiner* — Max Mathew
(74) *Attorney, Agent, or Firm* — Kilpatrick Townsend & Stockton LLP

(57) ABSTRACT

This application provides an antenna downtilt adjustment apparatus, including: a first transmission assembly, a flexible transmission assembly, and a second transmission assembly that are disposed on a mounting plate. The flexible transmission assembly includes a transmission element and a guiding element. The transmission element is in an integrated long strip shape and bendable. One end of the transmission element mates with the first transmission assembly, and the other end of the transmission element mates with the second transmission assembly. The guiding element is secured to the mounting plate, and the guiding element is configured to constrain an extension path of the transmission element on the mounting plate. The first transmission assembly is driven by an antenna information management module, and transmits a force to the second transmission assembly by using the transmission element. The second transmission assembly is configured to drive a phase shifter, to adjust an antenna downtilt.

20 Claims, 17 Drawing Sheets

(56) References Cited

U.S. PATENT DOCUMENTS

| | | | | |
|---|---|---|---|---|
| 2005/0003864 A1* | 1/2005 | Elliot | ............... | H01Q 1/246 |
| | | | | 455/562.1 |
| 2012/0127060 A1* | 5/2012 | Oh | ............... | H01P 1/184 |
| | | | | 343/912 |
| 2013/0127666 A1* | 5/2013 | Zhang | ............... | H01Q 1/246 |
| | | | | 342/359 |
| 2014/0043207 A1* | 2/2014 | Xie | ............... | H01P 1/184 |
| | | | | 343/904 |
| 2015/0084832 A1* | 3/2015 | Ai | ............... | H01Q 1/246 |
| | | | | 343/893 |
| 2016/0352011 A1* | 12/2016 | Duan | ............... | H01Q 3/32 |
| 2017/0084996 A1* | 3/2017 | Shen | ............... | H01Q 21/06 |
| 2018/0123240 A1* | 5/2018 | Liao | ............... | H01P 1/20 |
| 2018/0192307 A1* | 7/2018 | Xiao | ............... | H01Q 21/245 |
| 2019/0131703 A1* | 5/2019 | Meyer | ............... | H01Q 1/005 |
| 2019/0326663 A1* | 10/2019 | Liu | ............... | H01Q 21/061 |

* cited by examiner

ANTENNA DOWNTILT ADJUSTMENT APPARATUS AND COMMUNICATIONS DEVICE

CROSS-REFERENCE TO RELATED APPLICATIONS

This application is a continuation of International Application No. PCT/CN2017/078945, filed on Mar. 31, 2017. the disclosure of which is hereby incorporated by reference in its entirety

TECHNICAL FIELD

This application relates to the field of communications technologies, and specifically, to an antenna downtilt adjustment apparatus and a communications device.

BACKGROUND

In a mobile communications system, a beam tilt (generally referred to as a downtilt of a beam, a downtilt for short) of an antenna is adjusted to adjust an area covered by a mobile communications signal. The beam tilt of the antenna is adjusted by adjusting a phase shifter inside the antenna. In this way, a signal phase of each unit inside the antenna changes, thereby changing the beam tilt.

With limitation on a site resource of a mobile base station, a multi-band antenna is increasingly demanded. Currently, the multi-band antenna is already a mainstream application. Because of strength of a mechanical part (such as a pole or a tower) bearing the multi-band antenna, a structure size, especially a length and a width of the antenna needs to be as small as possible, to reduce wind load and weight. Therefore, smaller space occupied by a downtilt adjustment apparatus disposed inside the multi-band antenna is more conducive to reducing a size of the multi-band antenna.

Currently, a mainstream downtilt adjustment apparatus is transmitted and connected by using a rigid mechanical part, and cannot be flexibly disposed inside the antenna. In addition, because of a plurality of times of transfer connections and connections, the mainstream downtilt adjustment apparatus occupies large space inside the antenna, and has low transmission efficiency.

SUMMARY

Embodiments of this application provide an antenna downtilt adjustment apparatus and a communications device. The antenna downtilt adjustment apparatus has an advantage of flexible disposition, and can reduce a quantity of times of transfer connections and improve transmission efficiency.

A first aspect of this application provides an antenna downtilt adjustment apparatus, including: a first transmission assembly, a flexible transmission assembly, and a second transmission assembly that are disposed on a mounting plate. The flexible transmission assembly includes a transmission element and a guiding element. The transmission element is in an integrated long strip shape and bendable. One end of the transmission element mates with the first transmission assembly, and the other end of the transmission element mates with the second transmission assembly. The guiding element is secured to the mounting plate, and the guiding element is configured to constrain an extension path of the transmission element on the mounting plate. The first transmission assembly is driven by an antenna information management module, and transmits a force to the second transmission assembly by using the transmission element. The second transmission assembly is configured to drive a phase shifter, to adjust an antenna downtilt.

Specifically, the transmission element transmits a straight pull force or a rotational force between the first transmission assembly and the second transmission assembly.

In an implementation, the mounting plate is a metal reflection plate, to reflect an antenna signal. The transmission element is insulated from the mounting plate, to isolate the transmission element from an antenna, and to ensure an effect of receiving and sending a signal by the antenna.

In an implementation, the transmission element includes a transmission component and an insulated sleeve wrapped around a periphery of the transmission component. The insulated sleeve is wrapped around the periphery of the transmission component, to isolate the transmission component from the outside. Disposition of the insulated sleeve can isolate the transmission element from another component (for example, a component of the antenna) on the mounting plate, to avoid intermodulation.

In an implementation, the guiding element includes a securing part, a connecting part, and a mating part. The securing part is configured to be securely connected to the mounting plate, the connecting part is connected between the securing part and the mating part, and the mating part is configured to mate with the transmission element, to guide and support installation of the transmission element on the mounting plate. The connecting part is disposed between the mating part and the securing part, to absorb a vibration generated during a working process of the transmission element, thereby reducing impact of the vibration on the antenna.

In an implementation, a through hole is provided in the connecting part, and the through hole is provided between the mating part and the securing part. The provision of the through hole increases flexibility of the connecting part, and improves an effect of absorbing the vibration.

In an implementation, a material of the connecting part is a material having a buffer function, for example, silica gel. In this embodiment, an effect of absorbing the vibration generated by the transmission element of the connecting part is enhanced by selecting the material.

In an implementation, the antenna downtilt adjustment apparatus further includes a reset assembly. The reset assembly is elastically connected between the transmission element and the second transmission assembly, and is configured to provide a reset force for the transmission element.

Specifically, the reset assembly includes a spring and a securing block. The securing block is secured to the mounting plate, and installation space is provided between the securing block and the second transmission assembly. The spring is sleeved around a periphery of the transmission element and is accommodated in the installation space. One end of the spring is secured to the securing block, and the other end of the spring is secured to the second transmission assembly or the transmission element.

One part of the transmission element for sleeving of the spring and the other part of the transmission element may be of an integrated structure. Alternatively, a guiding rod may be secured to one end of the transmission element, and the spring may be sleeved around a periphery of the guiding rod. The guiding rod may be designed as a telescopic rod. A length of the guiding rod can be adjusted, and an elastic force of the spring may be adjusted by adjusting the length of the guiding rod.

In an implementation, the antenna downtilt adjustment apparatus further includes the antenna information management module and the phase shifter. The antenna information management module and the phase shifter are installed on a back side of the mounting plate and each are close to one of two opposite ends of the mounting plate. A radiating element of the antenna is disposed on a front side of the mounting plate. The phase shifter is connected to the radiating element of the antenna and is configured to adjust an antenna downtilt.

Specifically, a control plate and a communications interface and a motor that are electrically connected to the control plate are disposed in the antenna information management module. The communications interface is configured to receive a control signal from a base station. The control plate drives the motor after processing the control signal, and the motor is configured to drive the first transmission assembly.

In an implementation, the first transmission assembly includes a motor interface, the motor interface is connected to the motor of the antenna information management module, to transmit a driving force of the motor; and the antenna information management module drives the first transmission assembly by using the motor.

In an implementation, the second transmission assembly is a straight pull rod. One end of the straight pull rod is secured to the transmission element, and the other end is secured to the phase shifter. The first transmission assembly drives the transmission element to move, to push or pull the straight pull rod.

In an implementation, the first transmission assembly drives the transmission element to rotate. The second transmission assembly includes a worm and worm wheel assembly. A rotational motion of the transmission element drives a rotational motion of the second transmission assembly, and drives the phase shifter to rotate.

In an implementation, the second transmission assembly is a push and pull rod. A conversion assembly is disposed between the second transmission assembly and the transmission element. The first transmission assembly drives the transmission element to rotate, and the conversion assembly converts the rotational motion of the transmission element into a direct motion, to drive the second transmission assembly to move in a straight line.

Specifically, the conversion assembly includes a worm wheel, a worm, a gear, and a gear rack. The worm is connected to the transmission element, the gear rack is connected to the second transmission assembly, and the worm wheel shares a shaft with the gear. The transmission element drives the worm to rotate, drives the gear to rotate through mating of the worm and the worm wheel and synchronous rotation of the worm wheel and the gear, and drives the second transmission assembly to move in a straight line through mating of the gear and the gear rack.

In an implementation, there are at least two phase shifters and at least two second transmission assemblies. Each of the second transmission assemblies drives one phase shifter, to form a one-to-one correspondence. The transmission element is connected to the at least two second transmission assemblies.

In an implementation, there are at least two phase shifters, at least two second transmission assemblies, and at least two transmission elements. Each of the second transmission assemblies is connected between one transmission element and one phase shifter. A combiner module is disposed between the at least two transmission elements and the first transmission assembly, and the combiner module is configured to implement conversion between the first transmission assembly and the at least two transmission elements.

Specifically, the combiner module includes one input shaft and at least two output shafts. The input shaft is connected to the first transmission assembly, and the at least two output shafts are separately connected to the at least two transmission elements. A force between the input shaft and the at least two output shafts is transmitted by using a gear.

According to another aspect, this application further provides a communications device, including a base station and the foregoing antenna downtilt adjustment apparatus. An antenna information management module of the antenna downtilt adjustment apparatus is communicatively connected the base station, to receive a control signal from the base station, adjust an antenna downtilt, and report adjustment information to the base station.

According to the antenna downtilt adjustment apparatus provided in this application, the transmission element of the flexible transmission assembly is in an integrated long strip shape, so that the flexible transmission assembly transmits a force between the first transmission assembly and the second transmission assembly. The transmission element in an integrated long strip shape can reduce a quantity of times of transfer connections between the first transmission assembly and the second transmission assembly, and improve transmission efficiency. In addition, the transmission element is bendable, and therefore installation of the transmission element on the mounting plate is more flexible through mating of the transmission element and the guiding element. If there is a component that needs to be avoided on the extension path of the transmission element, the transmission element may be bent as required. In this way, the transmission element can be extended in an open area on the mounting plate.

BRIEF DESCRIPTION OF DRAWINGS

To describe the technical solutions in the embodiments of this application or in the prior art more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

To make the objectives, technical solutions, and advantages of the embodiments of this application clearer, the following describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

An embodiment of this application provides an antenna downtilt adjustment apparatus installed inside an antenna apparatus. The antenna apparatus is usually installed on a pole or a tower, and is communicatively connected to a base station. In a network, the base station is a part that connects a terminal to a wireless network, and may also be referred to as a radio access network (Radio Access Network, RAN) node, or a node or device that connects a terminal to a wireless network. The base station described in this application may also be another radio access network node, for example, a transmission reception point (Transmission Reception Point, TRP), an evolved NodeB (evolved Node B, eNB), a radio network controller (radio network controller, RNC), a node B (Node B, NB), a base station controller (Base Station Controller, BSC), a home base station (for example, Home evolved NodeB or Home Node B, HNB), a baseband unit (BaseBand Unit, BBU), or a Wi-Fi access point (Access Point, AP).

Figure 1:
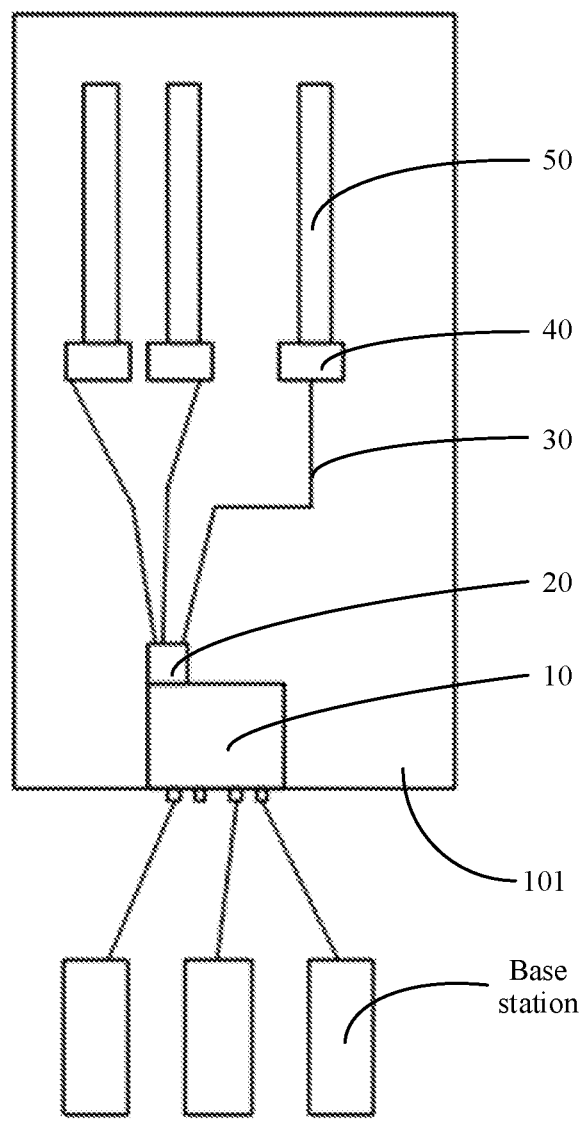
FIG. 1 is a schematic diagram of an application scenario of an antenna downtilt adjustment apparatus according to an implementation of this application.

As shown in FIG. 1, an antenna downtilt adjustment apparatus is provided, including: an antenna information management module 10, a first transmission assembly 20, a flexible transmission assembly 30, a second transmission assembly 40, and a phase shifter 50. The antenna information management module 10 is communicatively connected to a base station, and is configured to receive a control signal from the base station (for example, a signal sent by the base station indicates setting an antenna downtilt to 2 degrees) and drive the first transmission assembly 20 according to the control signal, so that the first transmission assembly 20 drives the flexible transmission assembly 30 to move. The flexible transmission assembly 30 transmits a force to the second transmission assembly 40, to further drive the phase shifter 50 to work. The phase shifter 50 is connected to an antenna, and the phase shifter 50 is configured to change the antenna downtilt (for example, adjusting the antenna downtilt to 2 degrees by using the phase shifter 50). At the same time, the antenna information management module 10 reports information about the antenna downtilt to the base station. The antenna information management module 10 stores a correspondence between a position of each second transmission assembly 40 and a downtilt. Specifically, the antenna information management module 10 may include a plurality of pairs of connectors, configured to be communicatively connected to a plurality of base stations. There may be a plurality of phase shifters 50. Therefore, the antenna downtilt adjustment apparatus provided in this embodiment of this application may adjust a plurality of antennas. Correspondingly, there may also be a plurality of flexible transmission assemblies 30, to drive the plurality of phase shifters 50 to move. One flexible transmission assembly 30 may also simultaneously drive two or more phase shifters 50.

The antenna downtilt adjustment apparatus includes a mounting plate 101 disposed in a housing (such as an antenna radome). In an embodiment, an antenna, specifically, a radiating element of the antenna is disposed on one side (side A) of the mounting plate 101. A transceiver circuit or a feeding circuit of the antenna may be disposed on another side (side B) of the mounting plate 101. The antenna information management module 10, the first transmission assembly 20, the flexible transmission assembly 30, the second transmission assembly 40, and the phase shifter 50 may be disposed on the side B of the mounting plate 101. The side A and the side B are two sides or two facets of the mounting plate. The antenna information management module 10 and the phase shifter 50 are located on the side B of the mounting plate 101 and each are close to one of two opposite ends of the mounting plate 101. The phase shifter 50 is connected to the radiating element of the antenna on the side A of the mounting plate 101. The phase shifter 50 is configured to adjust the antenna downtilt.

In an implementation, the mounting plate 101 is of a metal plate structure, to serve as a reflector of the antenna. In an implementation, the mounting plate 101 is an insulation plate, and a surface of one side of the mounting plate 101 on which the antenna is disposed is coated with a reflection layer (such as a metal layer), to reflect an antenna signal. In this case, the insulation plate can isolate apparatuses (such as the antenna information management module 10, the first transmission assembly 20, the flexible transmission assembly 30, the second transmission assembly 40, and the phase shifter 50) disposed on the other side of the antenna from the antenna, to ensure an effect of receiving and sending a signal by the antenna.

Figure 2:
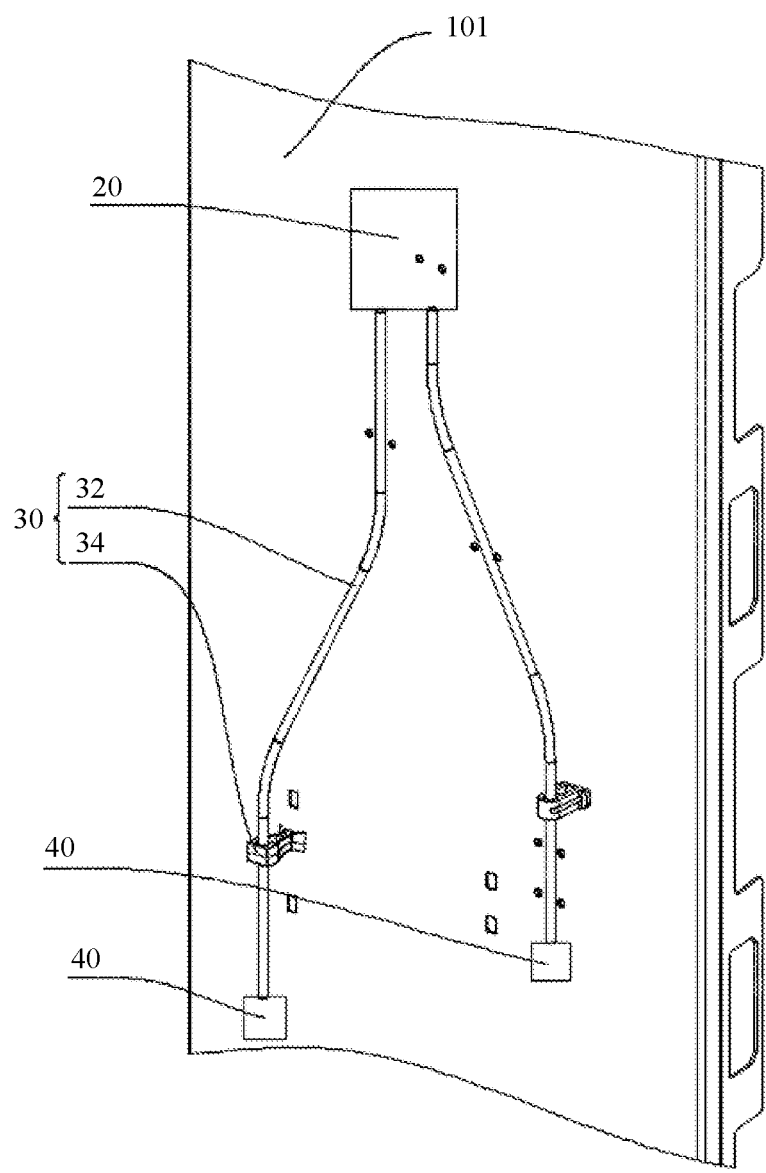
FIG. 2 is a schematic diagram of a layout of a flexible transmission assembly on a mounting plate of an antenna downtilt adjustment apparatus according to an implementation of this application.

FIG. 2 schematically depicts a disposition architecture of the flexible transmission assembly 30 on the mounting plate 101. The flexible transmission assembly 30 provided in this embodiment of this application includes a transmission element 32 and a guiding element 34. The transmission element 32 is in an integrated long strip shape, and the transmission element 32 is bendable. One end of the transmission element 32 mates with the first transmission assembly 20, and the other end of the transmission element 32 mates with the second transmission assembly 40. The transmission element 32 is connected between the first transmission assembly 20 and the second transmission assembly 40. Because the transmission element 32 is bendable, an extension path of the transmission element 32 on the mounting plate 101 is more flexible. The transmission element 32 may be flexibly disposed depending on a specific space of the mounting plate 101. If a position needs to be avoided, the transmission element 32 only needs to be bent. The extension path of the transmission element 32 on the mounting plate 101 is constrained by using the guiding element 34. To be specific, the guiding element 34 is configured to secure the transmission element 32 on the mounting plate 101, and guide the transmission element 32. The guiding element 34 is disposed at a position at which the transmission element 32 is bent, so that the transmission element 32 changes an extension direction after passing through the guiding element 34. There may be one, two, or more guiding elements 34. An extending part of the guiding element 34 between the guiding elements 34 (or between the guiding element 34 and the two ends of the transmission element 32) may be in a straight line shape.

In an implementation, the transmission element 32 is a steel rope, and the transmission element 32 that is in a form of a steel rope can transmit push and pull forces. The steel rope is bendable when a force is applied in a direction perpendicular to a length direction of the steel rope. If a push force or a pull force is applied to one end of the steel rope e, the steel rope can transmit the force from one end to the other end.

In another implementation, the transmission element 32 is a flexible core shaft, and is configured to transmit a rotational force. The flexible core shaft is easy to bend. After the guiding element 34 constraints an extension path of the flexible core shaft, a rotational force is applied to one end of the flexible core shaft, to enable the flexible core shaft to rotate. The flexible core shaft transmits a rotational force from one end to the other end, and therefore the other end of the flexible core shaft also rotates.

When the mounting plate 101 is a metal plate, an isolation component is disposed between the transmission element 32 and the mounting plate 101, to isolate the transmission element 32 from the mounting plate 101. In an embodiment, an insulation layer may be disposed on a surface of the mounting plate 101 on which the transmission element 32 is disposed. In another embodiment, an outer surface of the transmission element 32 is set to be insulated. Specifically, the transmission element 32 includes a transmission component and an insulated sleeve wrapped around a periphery of the transmission component. To ensure strength of the transmission component, the transmission component is made of a metal material. The insulated sleeve is wrapped around the periphery of the transmission component, to insulate the transmission component from the mounting plate 101, and can also isolate the transmission element 32 from another element (such as a component of an antenna) on the mounting plate 101, to reduce intermodulation (such as passive intermodulation, also referred to as intermodulation distortion, caused by nonlinear characteristics of passive components in a radio frequency system).

Figure 3:
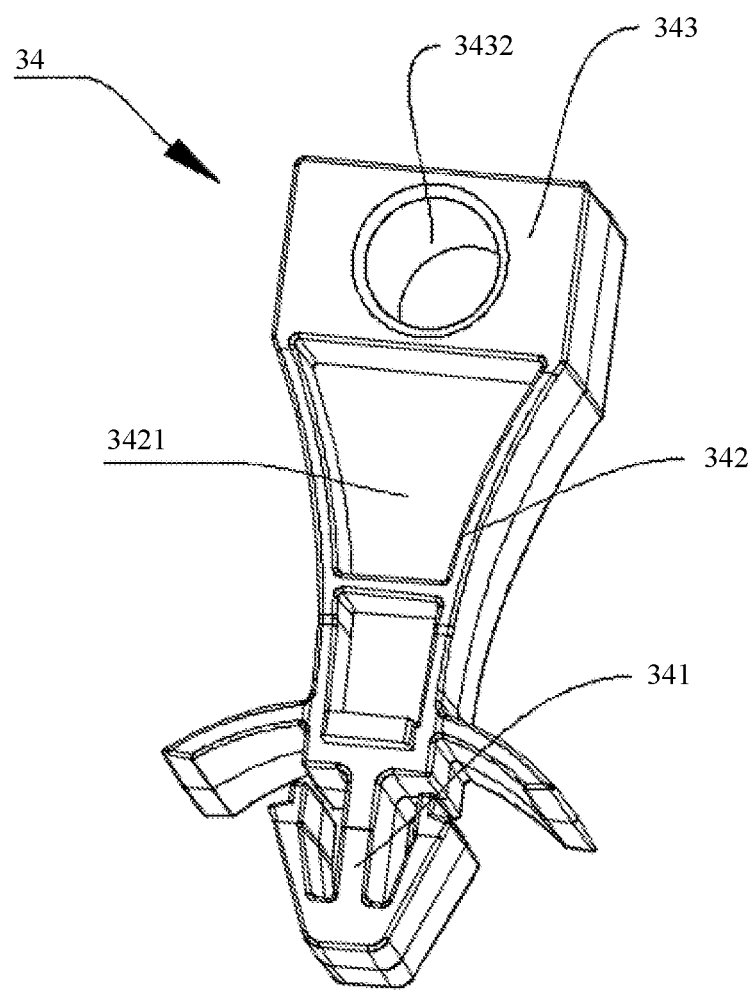
FIG. 3 is a schematic structural diagram of a guiding element of a flexible transmission assembly of an antenna downtilt adjustment apparatus according to an implementation of this application.
Figure 4:
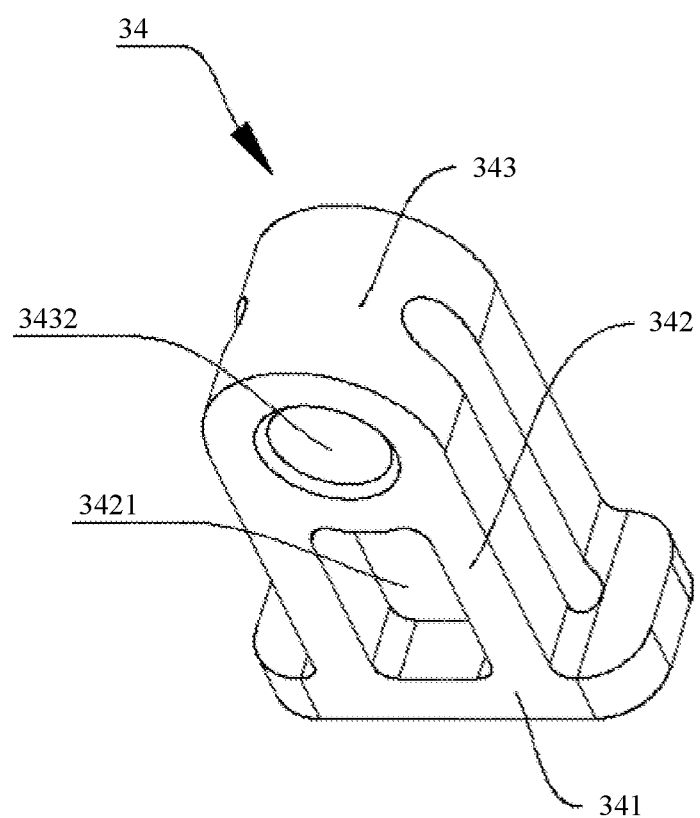
FIG. 4 is a schematic structural diagram of a guiding element of a flexible transmission assembly of an antenna downtilt adjustment apparatus according to an implementation of this application.

FIG. 3 and FIG. 4 show two guiding elements 34 of different structures. The guiding element 34 includes a securing part 341, a connecting part 342, and a mating part 343. The securing part 341 is configured to be securely connected to the mounting plate 101, the connecting part 342 is connected between the securing part 341 and the mating part 343, and the mating part 343 is configured to mate with the transmission element 32, to guide and support installation of the transmission element 32 on the mounting plate 101. The guiding element 34 may be made of a metal material, or may be made of a plastic material. A vibration may be generated during a working process of the transmission element 32. The mating part 343 is in direct contact with the transmission element 32, and is greatly affected by the vibration. The vibration may be transmitted to the connecting part 342, and the connecting part 342 can absorb a part of the vibration, thereby reducing impact of the vibration on the securing part 341. In other words, impact of the vibration on the mounting plate 101 is reduced. The antenna is disposed on the mounting plate 101, and the connection part 342 absorbs a part of the vibration. This reduces impact of the vibration generated on the antenna during the working process of the transmission element 32, thereby ensuring antenna performance.

Specifically, a through hole 3421 is provided in the connection part 342, and the through hole 3421 is provided between the mating part 343 and the securing part 341. The provision of the through hole 3421 is conducive to increasing elasticity of the connecting part 342 and increasing isolation between the mating part 343 and the securing part 341. In this way, the connecting part 342 absorbs more vibrations and reduces impact of a motion of the transmission element 32 on the mounting plate 101. As shown in FIG. 3 and FIG. 4, with the provision of the through hole 3421, the connecting part 342 serves as a rib connected between the securing part 341 and the mating part 343. A shape of the through hole 3421 is not limited herein.

In an implementation, materials of the mating part 343 and the securing part 341 are rigid, to implement stability of a connection between the mating part 343 and the transmission element 32 and stability of a connection between the securing part 341 and the mounting plate 101. A material of the connecting part 342 is a material having a buffer function, for example, silica gel. An effect of absorbing the vibration generated by the transmission element 32 of the connecting part 342 is enhanced by selecting the material.

The mating part 343 may be of a sleeve structure or a gripping jaw structure. Both the mating part 343 shown in FIG. 3 and the mating part 343 shown in FIG. 4 are of the sleeve structure. Specifically, a through hole 3432 is provided in the mating part 343, and the transmission element 32 passes through the through hole 3432. For ease of installation, a size of the through hole 3432 is greater than a peripheral size of the transmission element 32, so that the transmission element 32 easily passes through the through hole 3432. The gripping jaw structure may be understood as a pair of oppositely disposed gripping jaws disposed on the mating part. Clamping space is formed between the pair of gripping jaws. The transmission element 32 is clamped into the clamping space from an opening of the pair of gripping jaws, and the transmission element 32 is secured by a clamping force of the pair of gripping jaws. Specifically, the pair of gripping jaws secures the insulated sleeve of the transmission element 32, and the transmission component disposed in the insulated sleeve can be moved and rotated in the insulated sleeve.

The securing part 341 of the guiding element 34 shown in FIG. 3 is of a snap-fit structure. The guiding element 34 is installed on the mounting plate 101 through mating of a snap and a hook on the mounting plate 101. The securing part 341 of the guiding element 34 shown in FIG. 4 is of a screw assembly structure. A pair of screw holes is provided on the securing part 341, and the guiding element 34 is secured to the mounting plate 101 by screwing bolts into the pair of screw holes.

Figure 5:
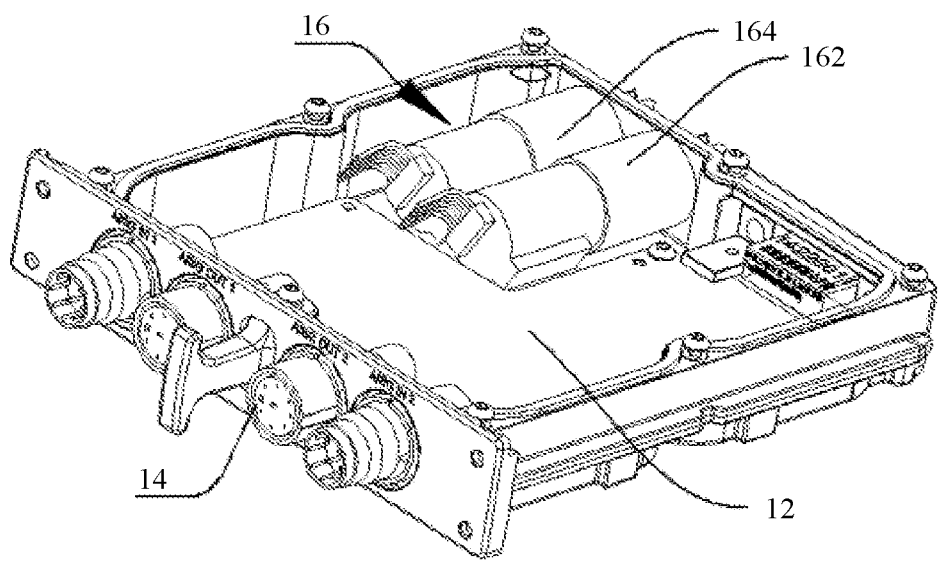
FIG. 5 is a schematic structural diagram of an antenna information management module of an antenna downtilt adjustment apparatus according to an implementation of this application.

FIG. 5 shows an internal structure of the antenna information management module 10. A control plate 12 and a communications interface 14 and a motor 16 that are electrically connected to the control plate 12 are disposed in the antenna information management module 10. The communications interface 14 is configured to be communicatively connected to a base station, to receive a control signal from the base station. A main control device (such as an RRU, namely, Remote Radio Unit, remote radio unit) of a mobile base station is connected to the communications interface 14 by using a cable assembly, and the communications interface 14 of the antenna information management module 10 may be an AISG connector. The control plate 12 drives the motor 16 to work after processing the control signal. The motor 16 includes a first motor 162 and a second motor 164. Both the first motor 162 and the second motor 164 are connected to the first transmission assembly 20 by using a mechanical structure disposed on a shaft end of the motor, to drive the first transmission assembly 20 to move.

Figure 6A:
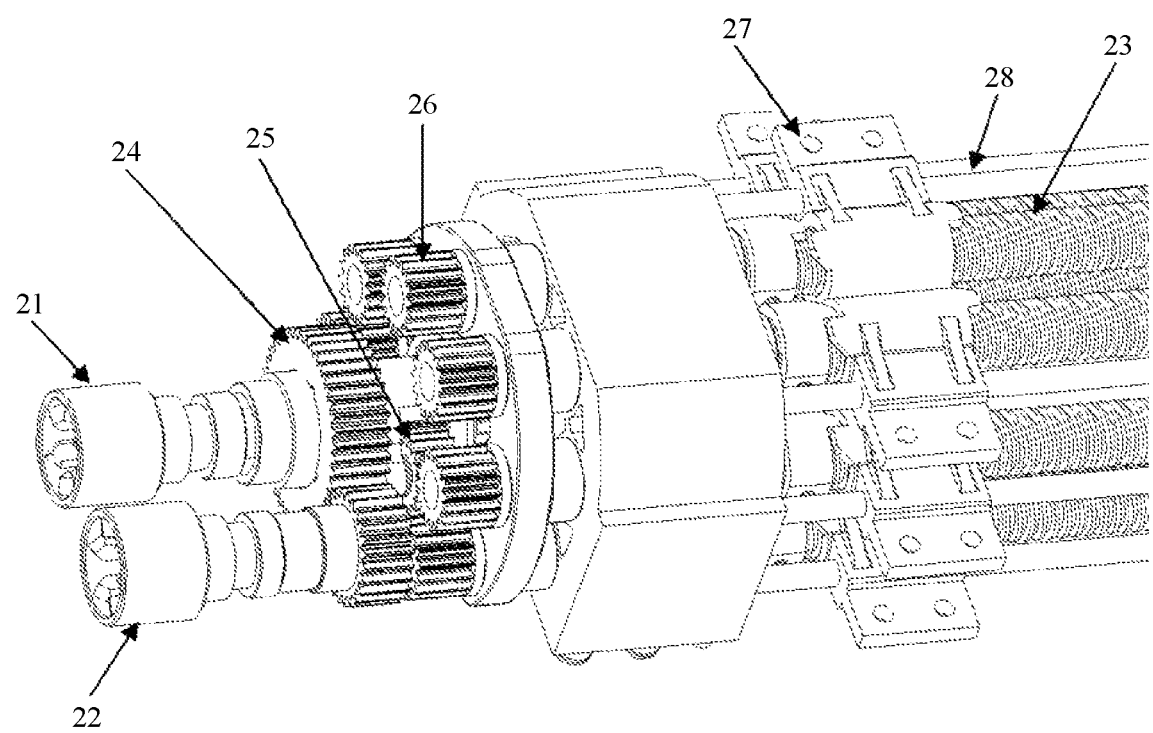
FIG. 6A is a schematic structural diagram of a first transmission assembly of an antenna downtilt adjustment apparatus according to an implementation of this application.

FIG. 6A is a schematic structural diagram of the first transmission assembly 20. The first transmission assembly 20 includes a first shaft 21 and a second shaft 22. The first shaft 21 and the second shaft 22 are connected to the first motor 162 and the second motor 164, respectively. Motor interfaces are disposed at an end of the first shaft 21 and an end of the second shaft 22, and the motor interfaces are configured to plug in and mate with transfer interfaces of the first motor 162 and the second motor 164, to accept a force from the antenna information management module 10.

Figure 6B:
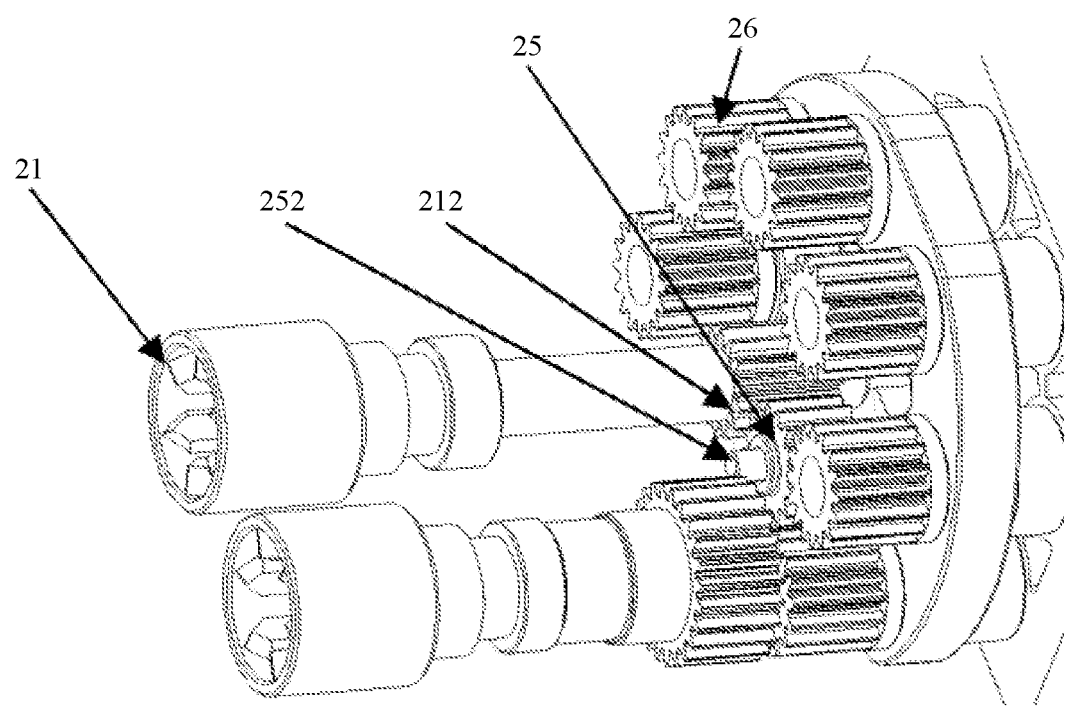
FIG. 6B is a schematic structural diagram of a hidden planetary carrier gear of the first transmission assembly in FIG. 6A.

The first transmission assembly 20 is connected to the transmission element 32, to drive the transmission element 32 to move in a straight line or rotate. In an implementation, the first transmission assembly 20 further includes a plurality of transmission screws 23, and each transmission screw 23 is connected to one transmission element 32. A force connection is formed between the motor interface and the transmission screw 23 by using a transmission shaft (namely, the first shaft 21) and a gear assembly. Referring to FIG. 6A and FIG. 6B, specifically, the gear assembly includes a planetary carrier gear 24, a planetary gear 25, and a plurality of transmission gears 26. A first gear 212 that meshes with the planetary gear 25 is disposed on the first shaft 21, and the planetary carrier gear 24 is also disposed on the first shaft 21. The planetary carrier gear 24 shares a shaft with the first gear 212. In FIG. 6A, the first gear 212 is obscured by the planetary carrier gear 24, while in FIG. 6B, the planetary carrier gear 24 is hidden, and the first gear 212 is visible. Rotation of the first shaft 21 drives the first gear 212 and the planetary carrier gear 24 to rotate. The planetary gear 25 is secured to the planetary carrier gear 24 by using a rotation center shaft 252. In a process in which the first shaft 21 drives the planetary carrier gear 24 to rotate, the rotation center shaft 252 follows rotation of the planetary carrier gear 24, so that the planetary gear 25 revolves. At the same time, the first gear 212 drives the planetary gear 25 to autorotate around the rotation center shaft 252. Centering around the first shaft 21, the plurality of transmission gears 26 are circularly disposed around a periphery of the planetary gear 25. Rotation angles of the planetary gear 25 correspond to different transmission gears 26. In this way, the planetary gear 25 meshes with different transmission gears 26, to select different transmission gears 26.

The transmission gears 26 are configured to drive the transmission screws 23. The first transmission assembly 20 further includes a transmission nut 27 and a transmission guiding rod 28 that mate with the transmission screw 23, and the transmission nut 27 is connected to the transmission guiding rod 28. Rotation of the transmission screw 23 drives the transmission nut 27 to move in a straight line along the transmission guiding rod 28. The transmission nut 27 is connected to the transmission element 32, to drive the transmission element 32 to move in a straight line, so that the transmission element 32 transmits a straight pull force between the first transmission assembly 20 and the second transmission assembly 40.

In another implementation, the transmission screw 23 may be directly connected to the transmission element 32. In this way, rotation of the transmission screw 23 drives the transmission element 32 to rotate, so that the transmission element 32 transmits a rotational force between the first transmission assembly 20 and the second transmission assembly 40.

In another implementation, the first transmission assembly 20 may not include the transmission screw 23, the transmission nut 27, and the transmission guiding rod 28, and directly use rotation of the transmission gear 26 to drive the transmission element 32 to rotate.

Figure 7:
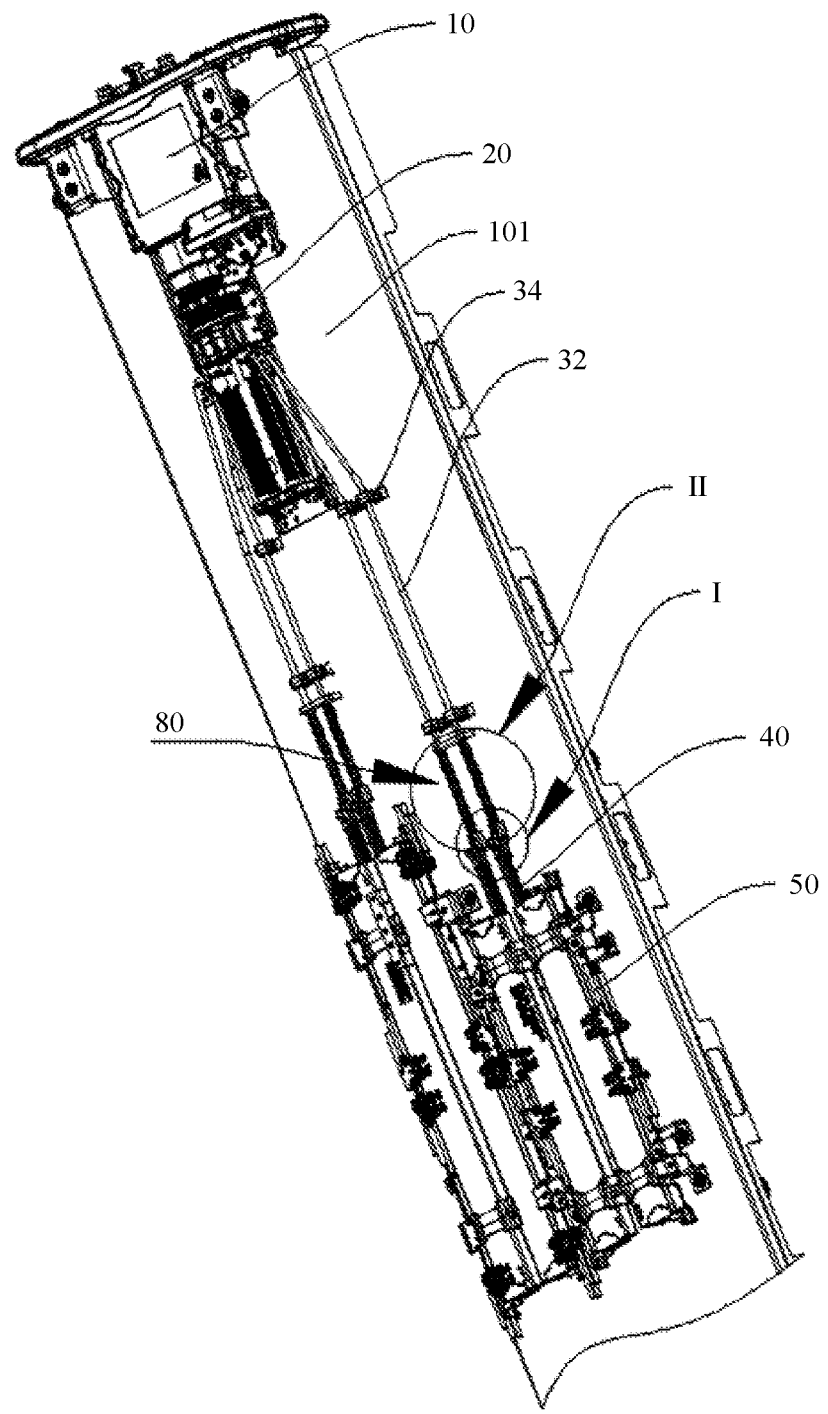
FIG. 7 is a schematic diagram of an antenna downtilt adjustment apparatus according to a first implementation of this application.
Figure 10:
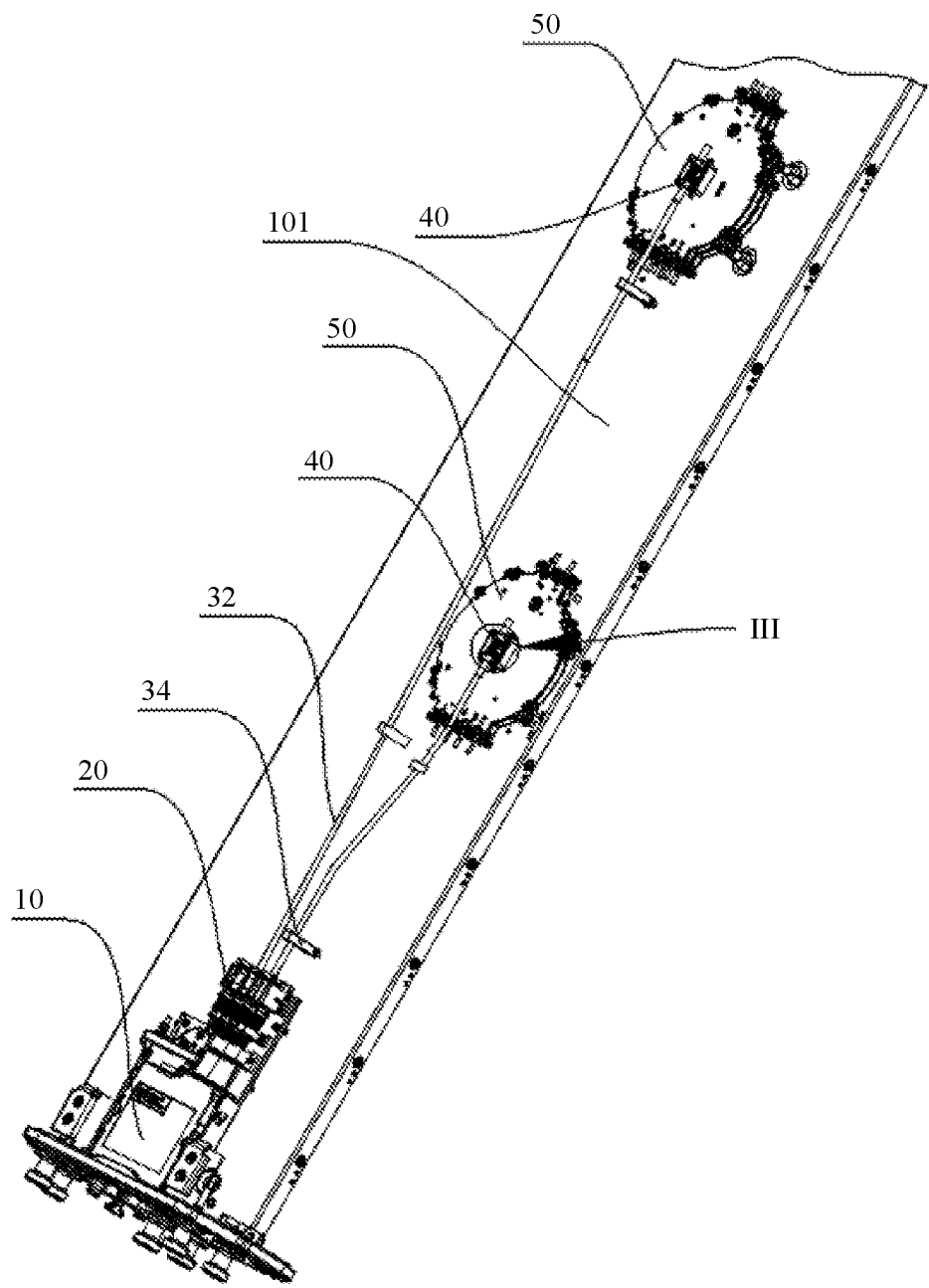
FIG. 10 is a schematic diagram of an antenna downtilt adjustment apparatus according to a second implementation of this application.
Figure 11:
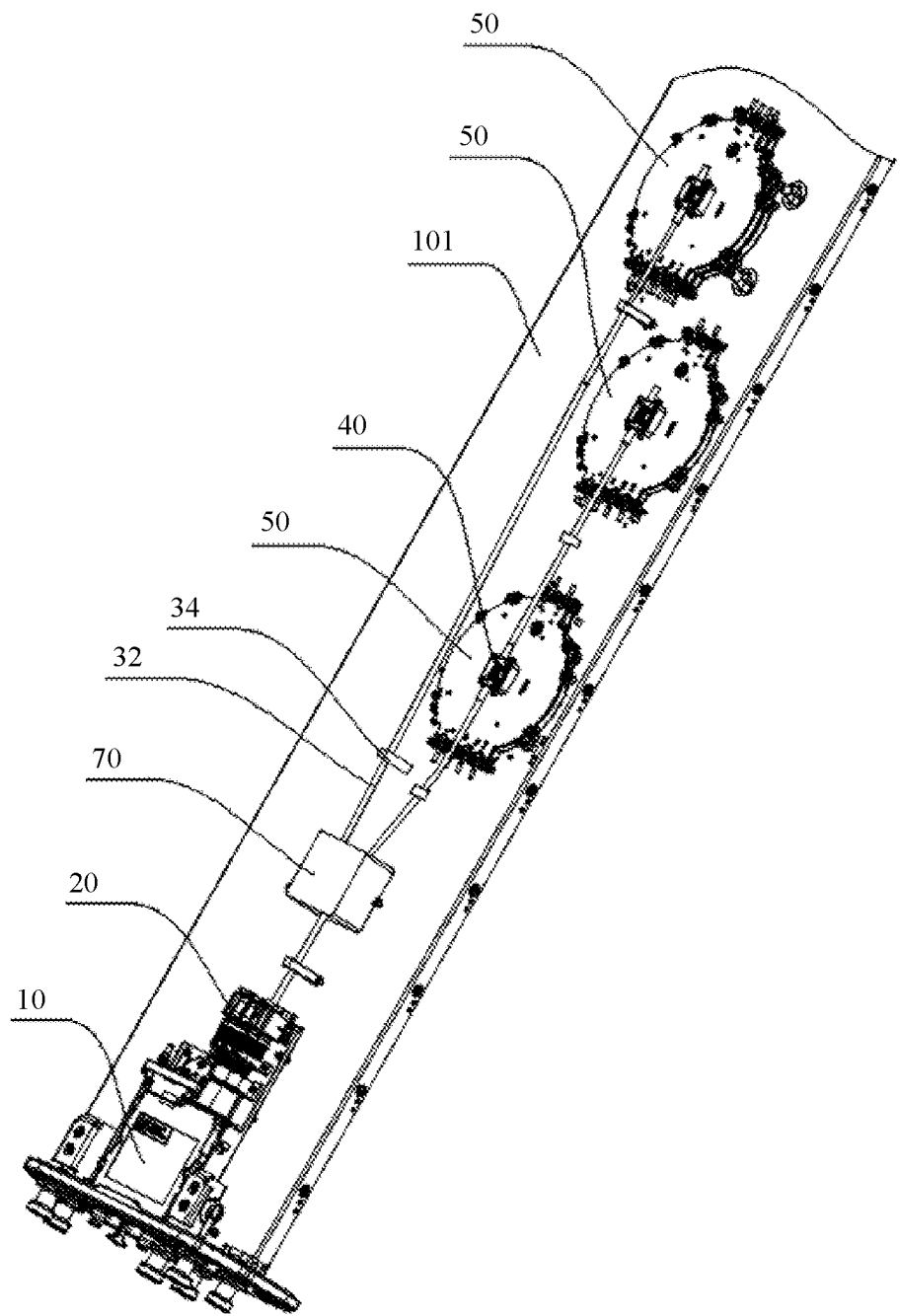
FIG. 11 is a schematic diagram of an antenna downtilt adjustment apparatus according to a third implementation of this application.
Figure 15:
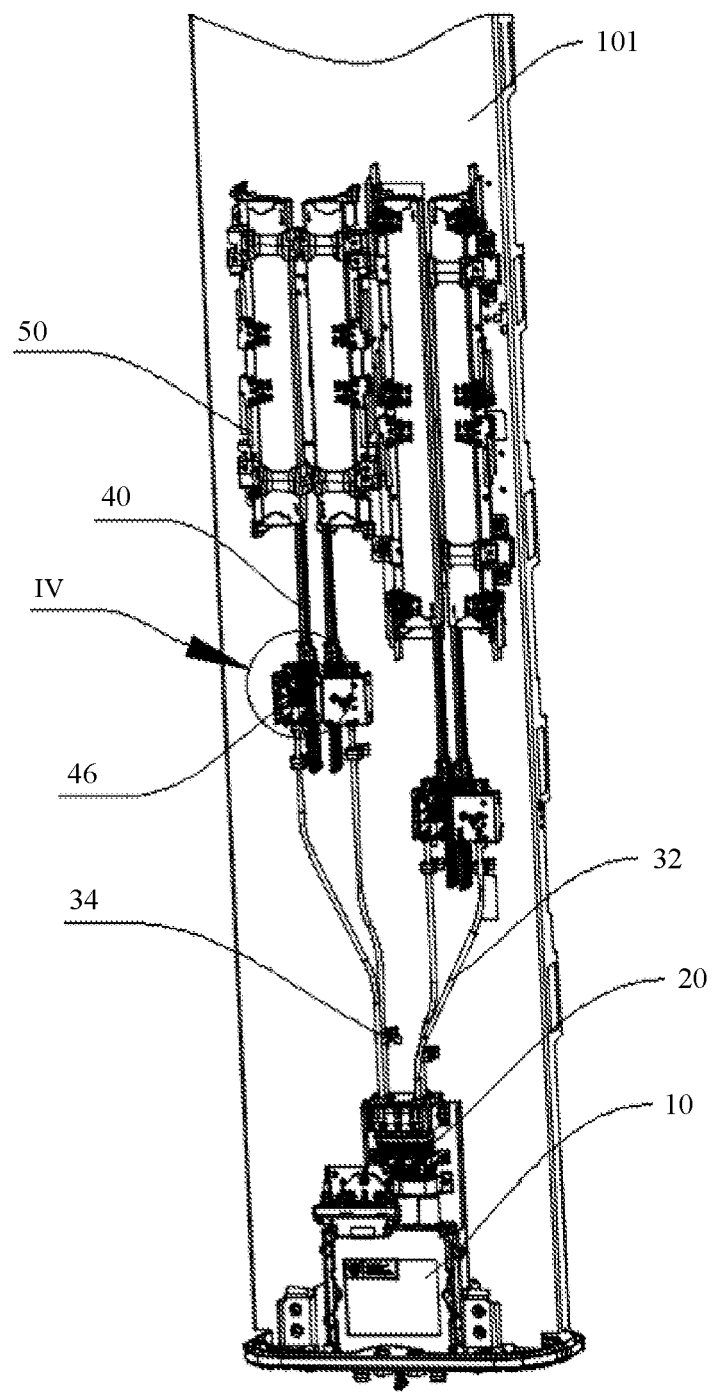
FIG. 15 is a schematic diagram of an antenna downtilt adjustment apparatus according to a fourth implementation of this application.

A transmission relationship between the transmission element 32 and the second transmission assembly 40 may be: a push and pull straight line translation (as shown in FIG. 7), a rotational motion of the transmission element 32 being converted into a rotational motion of the second transmission assembly 40 (as shown in FIG. 10 and FIG. 11), or a rotational motion of the transmission element 32 being converted into a straight line translation of the second transmission assembly 40 (as shown in FIG. 15). The following describes a specific architecture.

Figure 8:
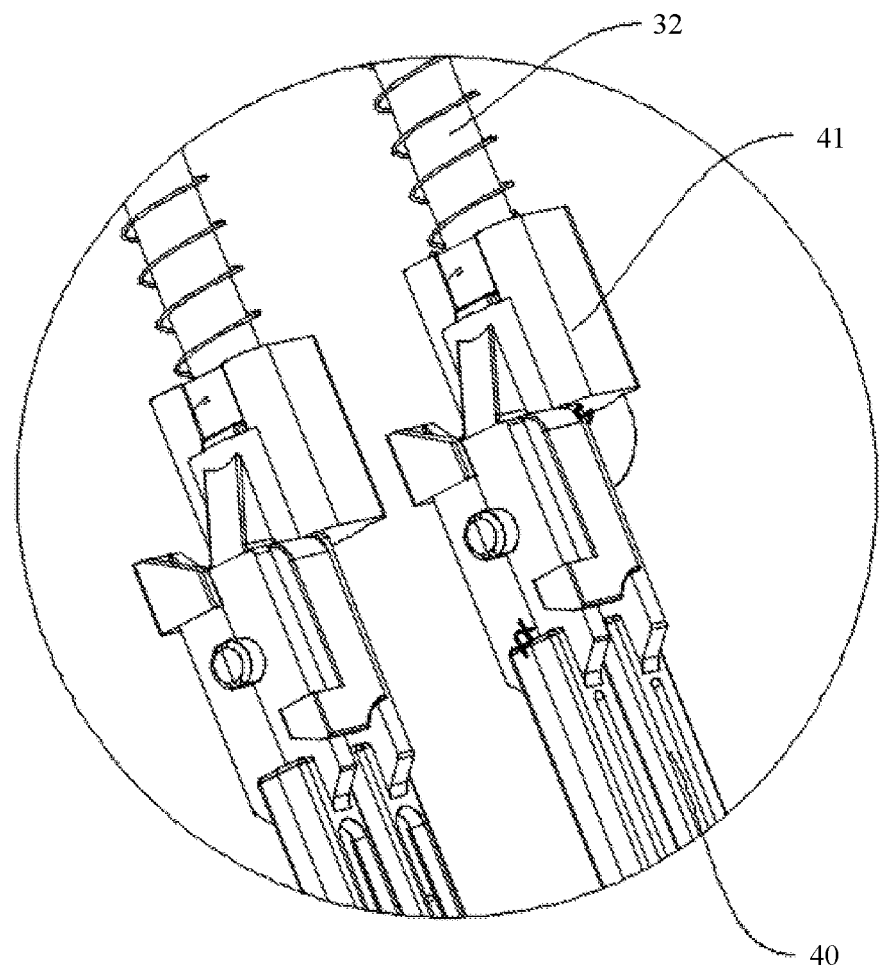
FIG. 8 is an enlarged schematic diagram of a part I in FIG. 7.

In an implementation, as shown in FIG. 7 and FIG. 8, the second transmission assembly 40 is a straight pull rod. One end of the straight pull rod is secured to the transmission element 32, and the other end is secured to the phase shifter 50. The first transmission assembly 20 drives the transmission element 32 to move, to push or pull the straight pull rod. The second transmission assembly 40 is securely connected to the transmission element 32 by using a pull rod adapter 41.

The antenna downtilt adjustment apparatus further includes a reset assembly 80. The reset assembly 80 is elastically connected between the transmission element 32 and the second transmission assembly 40. When the transmission element 32 drives the second transmission assembly 40, the reset assembly 80 is elastically deformed, and when a reverse move or a return is needed, the reset assembly 80 provides a reset force for the transmission element 32.

Figure 9:
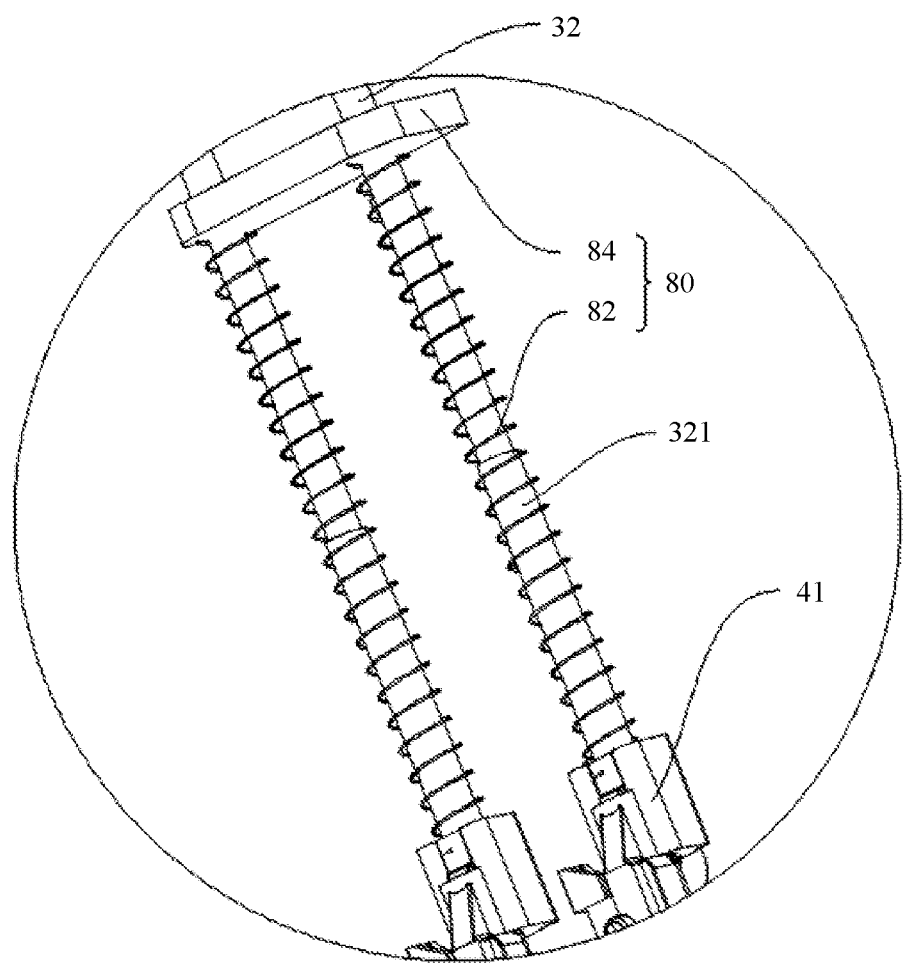
FIG. 9 is an enlarged schematic diagram of a part II in FIG. 7.

In the implementations shown in FIG. 7 and FIG. 9, the transmission element 32 transmits a straight pull force. To be specific, when the second transmission assembly 40 is pulled or compressed by a straight line motion of the transmission element 32, the reset assembly 80 is a reset mechanism in a straight line direction. Specifically, the reset assembly 80 includes a spring 82 and a securing block 84, the securing block 84 is secured to the mounting plate 101, and installation space is provided between the securing block 84 and the second transmission assembly 30. The spring 82 is sleeved around a periphery of the transmission element 32 and is accommodated in the installation space. Reset is implemented by using a resilient force of the spring

82. For example, if the motor 16 rotates in a forward direction to compress and stretch the spring and drive the phase shifter 50 to work, when the motor 16 rotates reversely, the transmission element 32 resets under the action of a spring force and also drives the phase shifter 50 to work in a reverse direction. One part of the transmission element 32 for sleeving of the spring 82 and the other part of the transmission element 32 may be of an integrated structure. Alternatively, a guiding rod 321 may be secured to one end of the transmission element 32, and the spring 82 may be sleeved around a periphery of the guiding rod 321. The guiding rod 321 may be designed as a telescopic rod. A length of the guiding rod 321 can be adjusted, and an elastic force of the spring may be adjusted by adjusting the length of the guiding rod 321.

One end of the spring 82 is secured to the securing block 84, and the other end of the spring 82 is secured to the second transmission assembly 40 or the transmission element 32. In the implementation example shown in FIG. 9, the other end of the spring 82 is secured to the pull rod adapter 41 of the second transmission assembly 40. Because the transmission element 32 and the second transmission assembly 40 are synchronously moved, a reset function may also be implemented when the spring 82 is secured to the transmission element 32. In a process in which the transmission element 32 drives the second transmission assembly 40 to move in a straight line relative to the securing block 84, the spring 82 is compressed or stretched.

In another implementation, if the transmission element 32 transmits a rotational force, in other words, if rotation of the transmission element 32 drives rotation of the second transmission assembly 40, the reset assembly 80 may be a reset mechanism in a rotation direction. Specifically, the reset assembly 80 may include a torsional spring (instead of the spring, to implement a resilient force in the rotation direction) and a securing block 84. The securing block 84 is secured to the mounting plate 101. One end of the torsional spring is secured to the securing block 84, and the other end of the torsional spring is secured to the second transmission assembly 40 or the transmission element 32. In a process in which the transmission element 32 drives the second transmission assembly 40 to rotate relative to the secured block 84, the torsional spring is elastically deformed.

Figure 12:
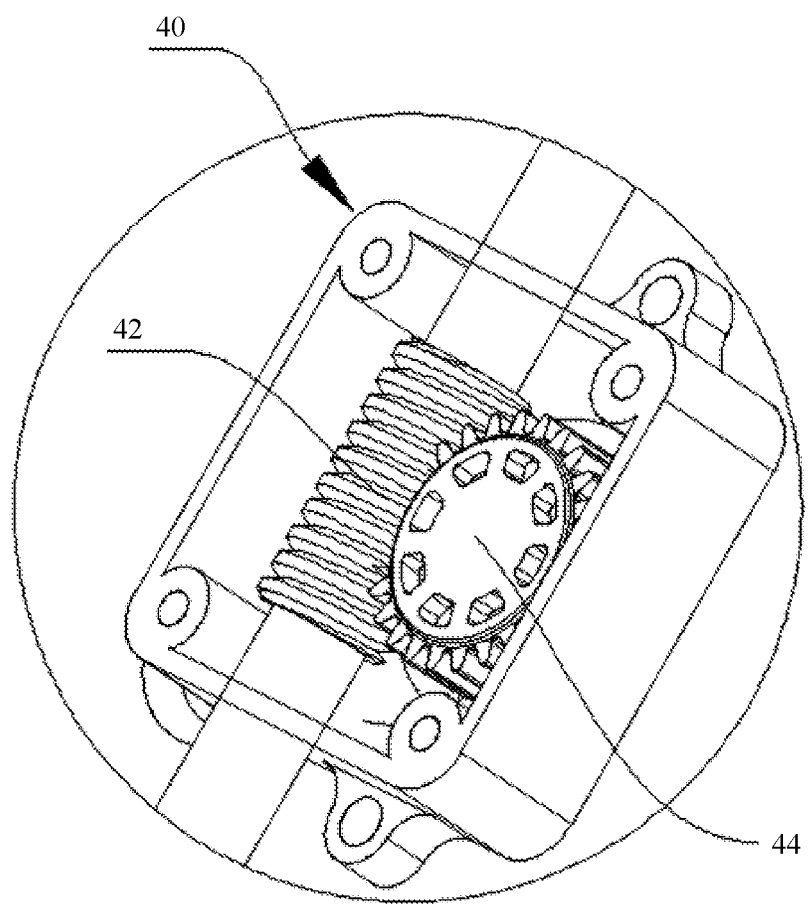
FIG. 12 is an enlarged schematic diagram of a part III in FIG. 10.

In an implementation, as shown in FIG. 10, FIG. 11, and FIG. 12, the first transmission assembly 20 drives the transmission element 32 to rotate. The second transmission assembly 40 includes a worm and worm wheel assembly. A rotational motion of the transmission element 32 drives a rotational motion of a worm 42 of the second transmission assembly 40. The worm wheel 44 is driven to rotate through mating of the worm 42 and a worm wheel 44, and then the phase shifter 50 is driven to rotate and adjust the antenna downtilt. The transmission element 32 and the worm 42 may be secured by welding. As shown in FIG. 11, the two phase shifters 50 may be connected in series to one end of a same transmission element 32. The two phase shifts 50 may be connected in series by using a flexible transmission element similar to the transmission element 32.

As shown in FIG. 11, at least two phase shifters 50, at least two second transmission assemblies 40, and at least two transmission elements 32 are disposed in a one-to-one correspondence. To be specific, each second transmission assembly 40 is connected between one transmission element 32 and one phase shifter 50, to form at least two transmission paths that are connected in parallel. A combiner module 70 is disposed between the at least two transmission elements 32 and the first transmission assembly 20, and the combiner module 70 is configured to implement conversion between the first transmission assembly 20 and the at least two transmission elements 32.

Figure 13:
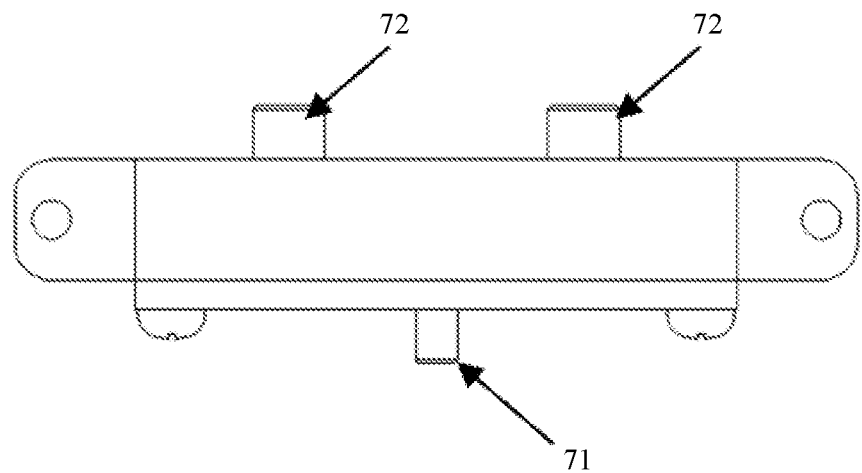
FIG. 13 is a schematic diagram of a combiner module of an antenna downtilt adjustment apparatus according to an implementation of this application.
Figure 14:
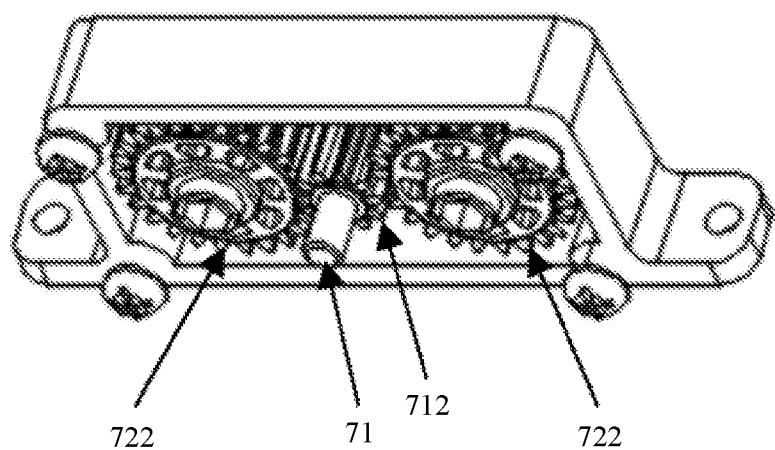
FIG. 14 is a schematic diagram of an internal structure of the combiner module in FIG. 13.

Specifically, as shown in FIG. 13 and FIG. 14, the combiner module 70 includes one input shaft 71 and at least two output shafts 72. The input shaft 71 is connected to the first transmission assembly 20, and the at least two output shafts 72 are separately connected to the at least two transmission elements 32. A force between the input shaft 71 and the at least two output shafts 72 is transmitted by using a gear. As shown in FIG. 14, an input gear 712 is disposed on the input shaft 71, an output gear 722 is disposed on each output shaft 72, and conversion between the first transmission assembly 20 and the two transmission elements 32 is implemented through simultaneous meshing of the input gear 712 and the two output gears 722. If there are more than two transmission elements 32, a planetary carrier and a planetary gear may be disposed in the combiner module 70. Conversion between the first transmission assembly 20 and a plurality of transmission elements 32 may be implemented through mating of a plurality of planetary gears and a sun gear connected to the input shaft 71.

Figure 16:
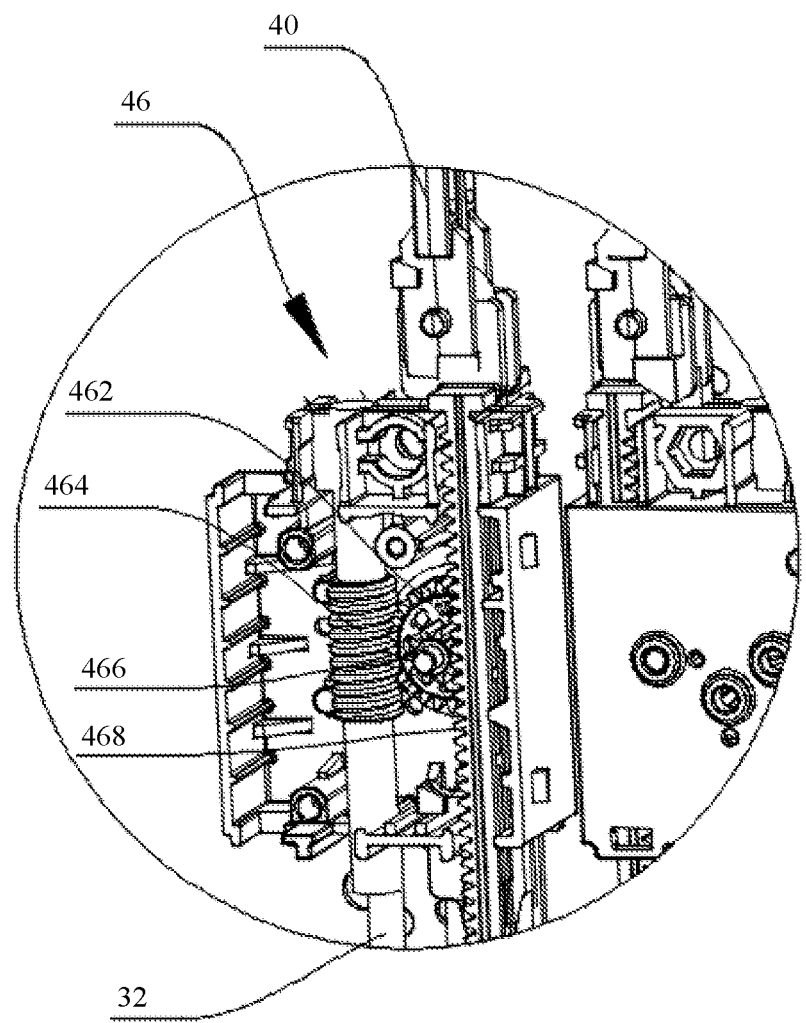
FIG. 16 is an enlarged schematic diagram of a part IV in FIG. 15.

As shown in FIG. 15, the second transmission assembly 40 is a push and pull rod, and can translate in a straight line. A conversion assembly 46 is disposed between the second transmission assembly 40 and the transmission element 32. The first transmission assembly 20 drives the transmission element 32 to rotate, and the conversion assembly 46 converts a rotational motion of the transmission element 32 into a direct motion, to drive the second transmission assembly 40 to move in a straight line. Specifically, as shown in FIG. 16, the conversion assembly 46 includes a worm wheel 462, a worm 464, a gear 466, and a gear rack 468. The worm 464 is connected to the transmission element 32, the gear rack 468 is connected to the second transmission assembly 40, and the worm wheel 462 shares a shaft with the gear 466. The transmission element 32 drives the worm 464 to rotate, drives the gear 466 to rotate through mating of the worm 464 and the worm wheel 462 and synchronous rotation of the worm wheel 462 and the gear 466, and drives the second transmission assembly 40 to move in a straight line through mating of the gear 466 and the gear rack 468.

In an implementation, the transmission element 32 can be simultaneously connected to at least two second transmission assemblies 40. There are at least two phase shifters 50 and at least two second transmission assemblies 40, and the at least two phase shifters 50 and the at least two second transmission assemblies 40 are disposed in a one-to-one correspondence. To be specific, each second transmission assembly 40 drives one phase shifter 50.

What is claimed is:
1. An antenna downtilt adjustment apparatus, comprising a first transmission assembly, a flexible transmission assembly, and a second transmission assembly that are disposed on a mounting plate, wherein the flexible transmission assembly comprises a transmission element and a guiding element; the transmission element is in an integrated long strip shape and bendable, one end of the transmission element mates with the first transmission assembly, and the other end of the transmission element mates with the second transmission assembly; the guiding element is secured to the mounting plate, and the guiding element is configured to constrain an extension path of the transmission element on the mounting plate; the first transmission assembly is driven by an antenna information management module, and transmits a force to the second transmission assembly by using the transmission element; and the second transmission assembly is configured to drive a phase shifter.

2. The antenna downtilt adjustment apparatus according to claim 1, wherein the transmission element transmits a straight pull force or a rotational force between the first transmission assembly and the second transmission assembly.

3. The antenna downtilt adjustment apparatus according to claim 1, wherein the mounting plate is a metal reflection plate, and the transmission element is insulated from the mounting plate.

4. The antenna downtilt adjustment apparatus according to claim 1, wherein the transmission element comprises a transmission component and an insulated sleeve, and the insulated sleeve is wrapped around a periphery of the transmission component.

5. The antenna downtilt adjustment apparatus according to claim 1, wherein the guiding element comprises a securing part, a connecting part, and a mating part, the securing part is configured to be securely connected to the mounting plate, the connecting part is connected between the securing part and the mating part, and the mating part is configured to mate with the transmission element, to guide and support installation of the transmission element on the mounting plate.

6. The antenna downtilt adjustment apparatus according to claim 5, wherein a through hole is provided in the connecting part, and the through hole is provided between the mating part and the securing part.

7. The antenna downtilt adjustment apparatus according to claim 5, wherein a material of the connecting part has a buffer function.

8. The antenna downtilt adjustment apparatus according to claim 1, wherein the antenna downtilt adjustment apparatus further comprises a reset assembly, and the reset assembly is elastically connected between the transmission element and the second transmission assembly, and is configured to provide a reset force for the transmission element.

9. The antenna downtilt adjustment apparatus according to claim 8, wherein the reset assembly comprises a spring and a securing block, the securing block is secured to the mounting plate, and installation space is provided between the securing block and the second transmission assembly; and the spring is sleeved around a periphery of the transmission element and is accommodated in the installation space, one end of the spring is secured to the securing block, and the other end of the spring is secured to the second transmission assembly or the transmission element.

10. The antenna downtilt adjustment apparatus according to claim 1, wherein the antenna downtilt adjustment apparatus further comprises the antenna information management module and the phase shifter, the antenna information management module and the phase shifter are installed on one side of the mounting plate and each are close to one of two opposite ends of the mounting plate, and a radiating element of the antenna is disposed on the other side of the mounting plate; and the phase shifter is connected to the radiating element of the antenna and is configured to adjust an antenna downtilt.

11. The antenna downtilt adjustment apparatus according to claim 10, wherein a control plate and a communications interface and a motor that are electrically connected to the control plate are disposed in the antenna information management module, the communications interface is configured to receive a control signal from a base station, the control plate drives the motor after processing the control signal, and the motor is configured to drive the first transmission assembly.

12. The antenna downtilt adjustment apparatus according to claim 11, wherein the first transmission assembly comprises a motor interface, the motor interface is connected to the motor of the antenna information management module, to transmit a driving force of the motor; and the antenna information management module drives the first transmission assembly by using the motor.

13. The antenna downtilt adjustment apparatus according to claim 1, wherein the second transmission assembly is a straight pull rod, one end of the straight pull rod is secured to the transmission element, and the other end is secured to the phase shifter; and the first transmission assembly drives the transmission element to move, to push or pull the straight pull rod.

14. The antenna downtilt adjustment apparatus according to claim 1, wherein the first transmission assembly drives the transmission element to rotate, the second transmission assembly comprises a worm and worm wheel assembly, and a rotational motion of the transmission element drives a rotational motion of the second transmission assembly, and drives the phase shifter to rotate.

15. The antenna downtilt adjustment apparatus according to claim 1, wherein the second transmission assembly is a push and pull rod, a conversion assembly is disposed between the second transmission assembly and the transmission element, the first transmission assembly drives the transmission element to rotate, and the conversion assembly converts a rotational motion of the transmission element into a direct motion, to drive the second transmission assembly to move in a straight line.

16. The antenna downtilt adjustment apparatus according to claim 15, wherein the conversion assembly comprises a worm wheel, a worm, a gear, and a 0gear rack, the worm is connected to the transmission element, the gear rack is connected to the second transmission assembly, and the worm wheel shares a shaft with the gear; and the transmission element drives the worm to rotate, drives the gear to rotate through mating of the worm and the worm wheel and synchronous rotation of the worm wheel and the gear, and drives the second transmission assembly to move in a straight line through mating of the gear and the gear rack.

17. The antenna downtilt adjustment apparatus according to claim 1, wherein there are at least two phase shifters and at least two second transmission assemblies, each of the second transmission assemblies drives one phase shifter, and the transmission element is connected to the at least two second transmission assemblies.

18. The antenna downtilt adjustment apparatus according to claim 1, wherein there are at least two phase shifters, at least two second transmission assemblies, and at least two transmission elements, each of the second transmission assemblies is connected between one transmission element and one phase shifter, a combiner module is disposed between the at least two transmission elements and the first transmission assembly, and the combiner module is configured to implement conversion between the first transmission assembly and the at least two transmission elements.

19. The antenna downtilt adjustment apparatus according to claim 18, wherein the combiner module comprises one input shaft and at least two output shafts, the input shaft is connected to the first transmission assembly, the at least two output shafts are separately connected to the at least two transmission elements, and a force between the input shaft and the at least two output shafts is transmitted by using a gear.

20. A communications device, wherein the communications device comprises a base station and the antenna downtilt adjustment apparatus according to claim 1, and an antenna information management module of the antenna downtilt adjustment apparatus is communicatively connected to the base station, to receive a control signal from the base station, adjust an antenna downtilt, and report adjustment information to the base station.

\* \* \* \* \*